C. W. FINK.
PORTABLE WATER TOWER.
APPLICATION FILED APR. 18, 1912.
1,090,783.
Patented Mar. 17, 1914.
4 SHEETS—SHEET 1.
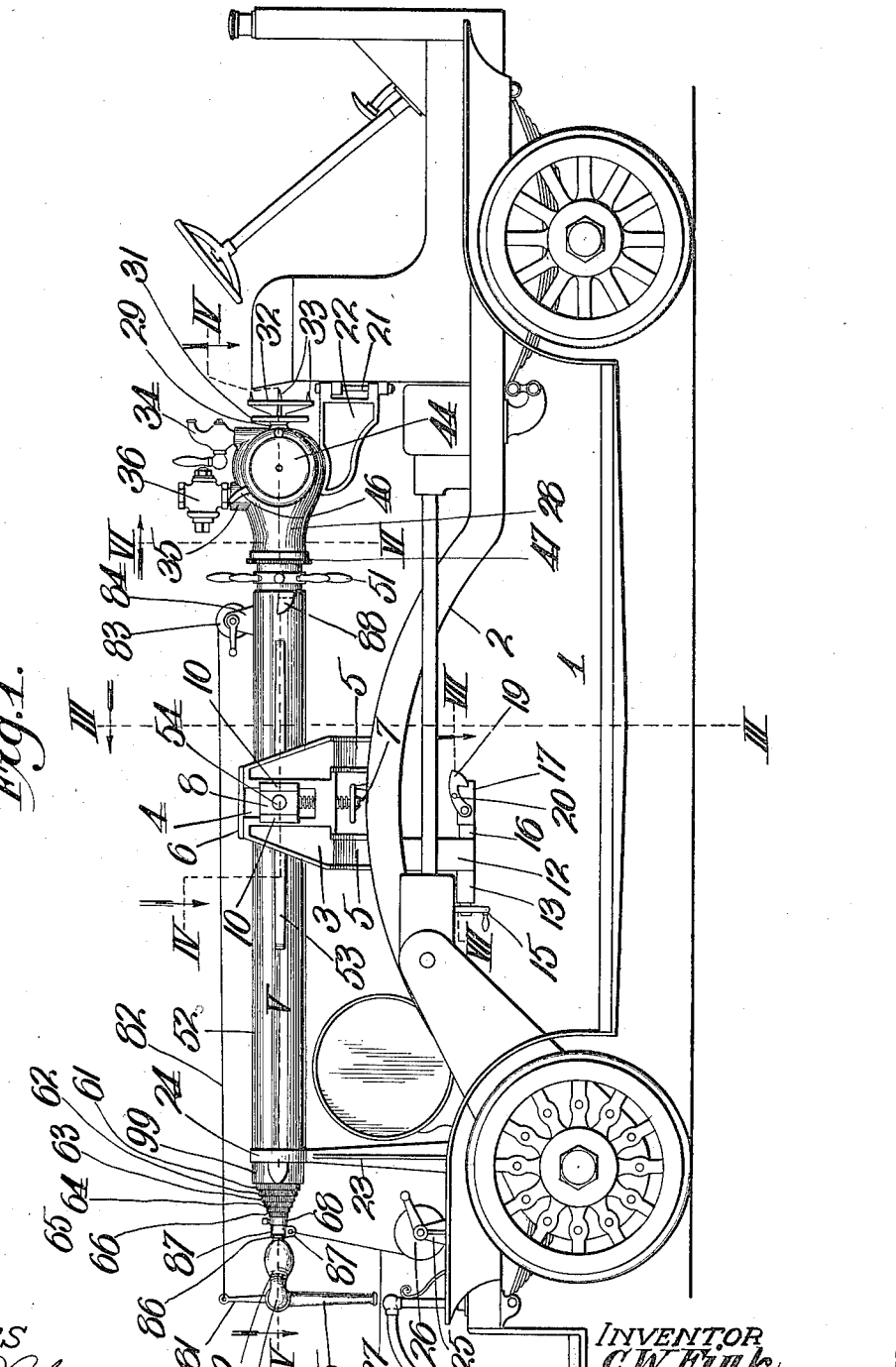
WITNESSES
Frank R. Glow
H. C. Rodgers
INVENTOR
C. W. Fink
BY George J. Thorpe
ATTY.

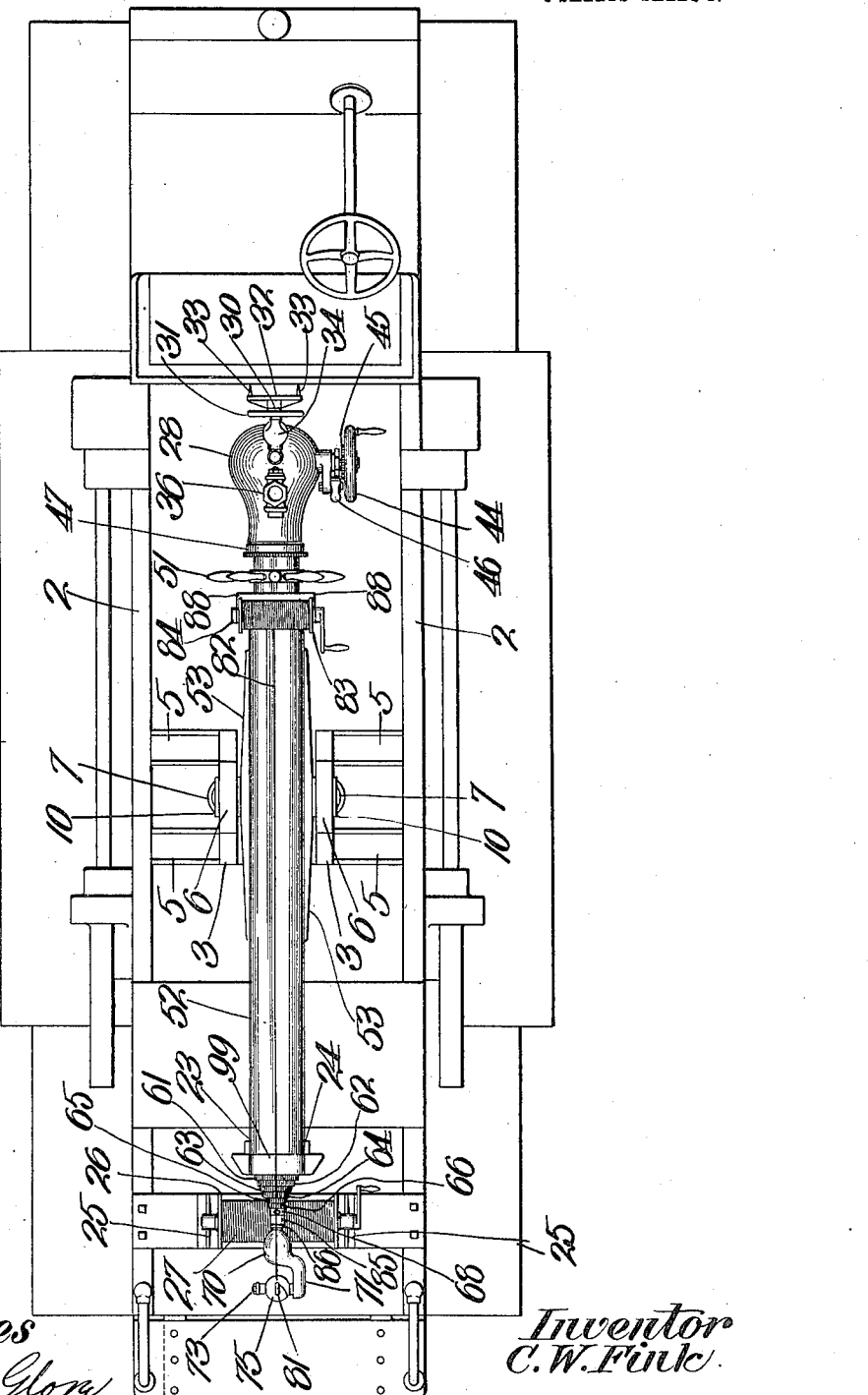

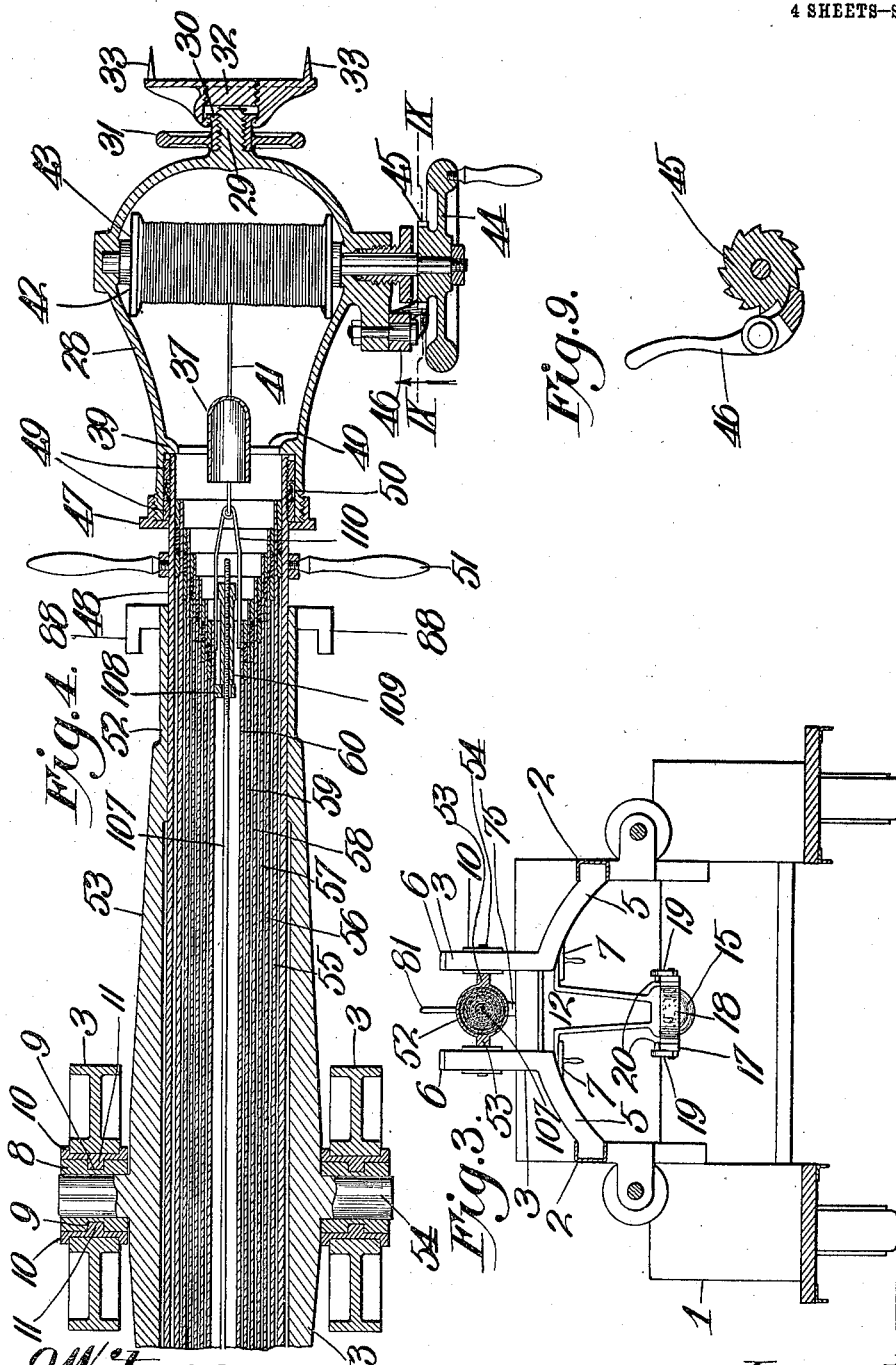

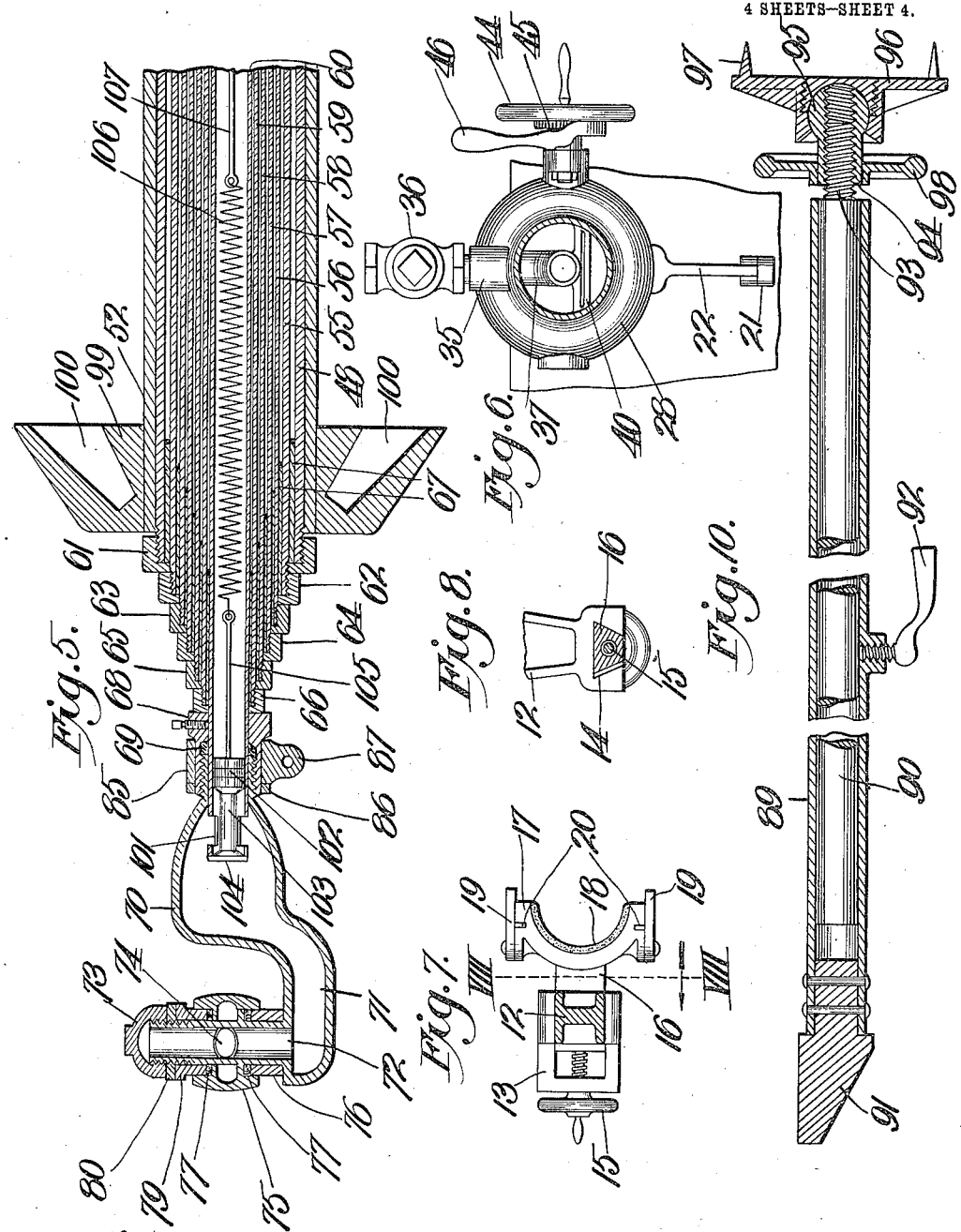

UNITED STATES PATENT OFFICE.

CLYDE W. FINK, OF KANSAS CITY, MISSOURI.

PORTABLE WATER-TOWER.

1,090,783. Specification of Letters Patent. Patented Mar. 17, 1914.

Application filed April 18, 1912. Serial No. 691,722.

*To all whom it may concern:*

Be it known that I, CLYDE W. FINK, a citizen of the United States, residing at Kansas City, in the county of Jackson and State of Missouri, have invented certain new and useful Improvements in Portable Water-Towers, of which the following is a specification.

This invention relates to portable water towers for use in extinguishing fires and my object is to produce a simple, compact and efficient machine of this character.

With this general object in view the invention consists in certain novel and peculiar features of construction and organization as hereinafter described and claimed, and in order that it may be fully understood reference is to be had to the accompanying drawings, in which—

Figure 1, is a side view of a portable water tower embodying my invention. Fig. 2, is a top plan view of the same. Fig. 3, is a vertical section on the line III—III of Fig. 1. Fig. 4, is an enlarged horizontal section on the line IV—IV of Fig. 1. Fig. 5, is a similar section on the dotted line V—V of Fig. 1, but on a larger scale than Fig. 4. Fig. 6, is an enlarged vertical section on the line VI—VI of Fig. 1. Fig. 7, is an enlarged horizontal section on the dotted line VII—VII of Fig. 1. Fig. 8, is a section on the line VIII—VIII of Fig. 7. Fig. 9, is a section on the line IX—IX of Fig. 4. Fig. 10, is a detail longitudinal section of one of the legs or braces of the tower.

In the said drawings, where like reference characters identify corresponding parts in all the figures, 1 is a wheeled vehicle, preferably a motor vehicle as shown, and said vehicle is provided with a pair of arched longitudinal bars 2, which in practice may be the side bars of the chassis. At opposite sides and equal distances from the longitudinal center of the car and over the space between the arched bars 2, is a pair of frames 3, provided with vertical bifurcations 4 and with legs 5 of arch form, the said legs being secured in any suitable manner to the arched bars 2. 6 is a cap closing the upper end of the bifurcation of each of said frames and 7 are adjusting screws extending up through said frames into slots 4, for the purpose of independently reasing or lowering bearing boxes 8, arranged in said bifurcations and provided in their opposite sides with recesses 9 (Fig. 4), the boxes fitting snugly between a pair of grooved gibs 10, slidingly secured in the bifurcations and provided with inwardly-projecting trunnions 11 engaging recesses 9, to permit of pivotal movement of the boxes, for a purpose which hereinafter appears.

12 is a T-shaped brace secured to and depending from the rearmost legs 5 of the frames 3, the stem of the brace having a rearwardly-projecting horizontal loop 13, and a dove-tail groove 14, and journaled in said loop is a screw 15, threaded into a bar 16 fitting slidingly in the dove-tail groove 14. At its front end said bar is provided with a semicircular head or yoke 17, lined with a suitable cushion 18, and pivoted to opposite sides of the semicircular head is a pair of gravity or equivalent catches 19. To guard against unrestrained downward movement of the catches and to hold them normally in operative position as shown in Fig. 1, pins 20 are employed, these pins being shown as fastened to the catches and overlying the head 17.

Pivoted at 21 to the back of the seat of the vehicle, is a shelf or support 22, and rising from the rear portion of the vehicle is a standard 23 terminating at its upper end in a fork 24, and mounted on the vehicle rearward of standard 23, are standards 25, forming journals for a reel 26, upon which is wound a cable 27.

The tower proper, in this machine, is in most respects a duplication of that upon which I secured Patent No. 1009293, November 21, 1911. Referring to the tower, 28 is a hollow base or socket provided centrally of its lower end with a threaded stem 29 on which is screwed an externally-flanged collar 30, and secured on said collar to screw the same up or down on said stem, is a hand wheel 31.

32 is an anchor block loosely swiveled on the flanged end of sleeve 30, so as to be raised and lowered through the adjustment of the hand-wheel to accommodate any inclination of the street surface, and to guard against slippage, the anchor block is provided with a plurality of depending prongs 33. It will be understood that the terms upper and lower and top and bottom are used with reference to the tower when in upright or operative position, as hereinafter more particularly referred to.

The hollow base is provided near its lower extremity with a drain cock 34 and at a suitable point with an intake 35 (Fig. 6), controlled by a valved coupling 36 to which a hose, not shown, is adapted to be connected for discharging water into the base, the intake having an arcuate extension 37 within the base, for the purpose of discharging the water supplied by the hose, vertically upward through the base. Near its upper end the base is provided internally with an annular shoulder 39 (see Fig. 4), and a slotted cross bar 40, is provided as a guide for a cable 41, leading to a drum 42 journaled on a shaft 43 projecting at one end through the wall of the base, and equipped with a hand wheel 44, by which the drum may be turned in one direction or the other, and rotatable with said wheel is a ratchet wheel 45 (see Fig. 9) to be engaged by a gravity or equivalent catch 46, when it is desired to arrest the unwinding movement of the drum, as hereinafter more particularly referred to.

47 is a flanged collar secured to the upper end of the base, and projecting inwardly of and journaled in said collar is the lower end of a tube 48, that portion of said tube 48 inclosed by the hollow base being equipped with a pair of rigid rings 49 fitting snugly in the base and capable of turning therein, and to make a water-tight joint between said tube and the base, a packing ring 50 encircles the tube and is clamped between the said rings. For convenience in turning said tube it is encircled just above the base by a hand wheel 51.

52 is a cylindrical protecting casing fitting on the tube 48, and stiffened by longitudinal ribs 53 and provided with a pair of oppositely projecting trunnions 54, pivotally engaging the boxes 8, so that said tubular casing may be swung from a horizontal position as shown, to substantially a vertical position, and hence impart like movement to tube 48, and the hollow base, as well as to a series of tubes, 55, 56, 57, 58, 59 and 60 arranged in telescopic relation with each other and tube 48. Tubes 55 to 60 inclusive, are each provided externally with a pair of collars and a packing ring between them, corresponding in all respects to collars 49 and packing ring 50 of tube 48, the packing rings of the tubes 55 to 60 inclusive, bearing against and forming water tight joints with the tubes 48 to 59 inclusive as shown in Fig. 4. As these collars and packing rings of tubes 55 to 60 inclusive, are identical in construction and function with collars 49 and packing ring 50, of tube 48, they are not identified by reference characters nor are they specifically described, for the additional reason that they correspond exactly to the collars 41 and 42 and packing rings 43 shown and described in my prior patent hereinbefore identified.

Secured upon the upper ends of tubes, 48, 55, 56, 57, 58 and 59 (see Fig. 5) are angle rings, 61, 62, 63, 64, 65 and 66, which project inward sufficiently to form journals for the upper ends of the inclosed tubes and secured within the upper ends of 48 and 55 to 60 inclusive, are collars 67 against which the upper collar of each of said pairs of external collars 49 respectively secured on tubes 55 to 60 inclusive, abut when the respective tubes are fully extended.

68 is a collar secured on tube 60 and containing a packing ring 69, and screwed into said collar and fitting snugly upon and communicating with tube 60 is a hollow head 70, provided at one side with an extension 71, equipped with a laterally projecting communicating tube 72 closed at its free or outer end by cap 73, and provided at a suitable point between its ends with a discharge opening 74, communicating with the nozzle 75, pivoted on said tube 72. The pivoted end of the nozzle is provided at each side with a recess, containing packing rings 77, and secured on the tube 72 to clamp the packing rings in said recesses, are packing glands 79, the latter being secured in position by a nut 80 which in turn is prevented from turning accidentally by the cap 73 which acts as a lock nut. The nozzle tends to swing downward by gravity, and is equipped with an arm 81 (Fig. 1), connected by a cable 82 to a reel 83 journaled in bearings 84 carried by casing 52, any suitable mechanism, such as a pawl and ratchet, not shown, being employed to secure the reel with the nozzle pointed in the desired direction, it being understood that the nozzle is pivoted for movement in a vertical plane only.

85 is a collar pivoted on collar 68 between the enlarged or lower end thereof and a collar 86 secured on the upper extremity of collar 68, and said collar 85 is provided with an arm 87 connected to cable 27, so that by turning reel 26, cable 27 will be unwound and permit the casing and the tubes of the tower proper, to swing downward to a vertical position, provided the shelf 22 is first swung from under the hollow base of the tower, and assuming that this position of the shelf has been attained, the tower will swing downward as explained because the base portion thereof is heavier, until the lower end of the tubular support enters the semicircular head 17 and is arrested thereby, and in order to lock the tower in the substantially upright position it occupies when its lower end is within said semicircular head, lugs 88 projecting from opposite sides of casing 52, are adapted to raise catches 19 and then release them, the catches dropping over the lugs and holding the tower in its upright position as the latter is arrested by the head, as explained.

When the tower is in its substantially upright position, hand wheel 31 is manipulated to lower anchor block 32 to effect engagement between the same and the ground, so that the major portion of the weight of the tower shall rest upon the ground. In the event the machine is standing on a street which has more or less pitch or inclination toward the curb line, the tower under ordinary circumstances, will lean toward the nearest curb and to rectify this, the set screw 7 at the side toward which the tower leans, is raised, or the other set screw is lowered so as to bring the tower to a vertical position as regards lateral tilting.

To tilt the tower more or less longitudinally of the machine, the screw 15 is turned to impart longitudinal movement in the desired direction to the head or carrying bar 16. After the tower, in its retracted condition is secured in an upright position, it is adapted to be braced by means of a plurality of telescopic legs consisting of tubes 89 and bars 90 (Fig. 10), the former having tapered heads 91 for a purpose which hereinafter appears. The bars 90 are normally held withdrawn within the tubes 89 by means of set screws 92. As said legs are adapted to stand at different angles more or less sharp with respect to the street surface, they are provided at their lower end with threaded stems 93 upon which are screwed sleeves 94 provided with ball heads 95, and socketed upon said heads so as to be capable of angular adjustment, are anchor plates 96, provided with prongs 97 for embedment in the ground, and to adjust said anchor plates longitudinally of the legs, hand wheels 98 are secured rigidly on the sleeve 94.

To utilize the legs, a collar 99 (Fig. 5) is secured on the upper end of casing 52, and is provided with upwardly-converging, upwardly-tapering sockets 100 to receive the tapered heads 91 of the legs. By the loosening of set screws 92, the legs automatically extend until the anchor plates engage the ground and turn to accommodate the pitch thereof with respect to the inclination of the legs. The set screws are then turned to clamp the bars 90 rigidly in position and then wheel 98 is turned to clamp the anchor plate on or in the ground to guard against slippage.

The upper extremity of the tube 60 is provided with one or more discharge openings 101, and fitting in said tube below said opening is a plunger valve 102, provided with an upwardly projecting stem 103, having a cap 104, overlying the upper end of said tube to limit downward movement of the valve 102. Depending from the valve is a rod 105 connected by a retractile spring 106 to a rod 107, extending through a lug 108 within and near the lower end of the tube, and engaging said rod and bearing against the underside of said lug is a nut 109 (Fig. 4). 110 is a link depending from the lower end of the tube 60 and connected to the free end of cable 41.

After the tower is arranged in upright position, and braced as explained, a hose, not shown, is secured to the valve coupling 36 to conduct water under pressure into the hollow base, which water through the extension 37 is caused to shoot upwardly through the innermost tube 60 and exert sufficient upward pressure on the valve 102 to slide the said tube 60 upward until the upper one of its collars 49 engages ring 67 of tube 59. Said tube 59 is then raised in a similar manner by the pressure of the water on valve 102, until arrested by contact of the upper one of its collars 49 with the ring 67 of tube 58. Tube 58 is likewise raised from the same cause, these actions continuing until the upward movement of tube 55 is arrested, when the tower is completely extended, and as it is completely extended, the pressure of the water overcomes the resistance of retractile spring 106 and raises the valve 102, until it uncovers opening 101, it being noted that the valve cannot be forced entirely out of the tube 60 because head 104 comes in contact with the top of head 70 as the valve attains the upper ends of opening 101, and as the valve is thus unseated, the water passes into the head 70 and thence through arm 71, tube 72 and the nozzle 75.

If it is desired to vary the vertical inclination of the nozzle it is accomplished by the manipulation of reel 83. If it is desired to vary its position horizontally or longitudinally, so as to discharge water in a particular direction, the hand wheel 51 is manipulated to rotate the outermost tube 48 in the hollow base, there being sufficient friction between the various tubes to insure the rotation of all of them when the tube 48 is turned.

When the use of the tower is discontinued, the water is turned off and valve 102 closes automatically under the retraction of the spring 106. The hose is then uncoupled from the tower and the cock 34 is opened to drain the water from the latter, and permit the tubes, 60, 59, 58, 57, 56, and 55 to gravitate downward and assume their original relation within the tube 48 and casing 52, it being understood that the cable 41 is rewound upon drum 42 as the tubes descend.

It will be noted that when the casing and tower are upright, the catches 19 are interlocked with the lugs 88 at the lower end of the casing and there is no possibility of the tower falling to a horizontal position when fully or partly extended.

Under ordinary conditions the nozzle will be pointed in a rearward direction generally with respect to the truck and as the tendency of the upper end of the tower is to kick-back as water under pressure is discharged from the nozzle, I provide the cable 27 which acts as a seat or brace against this kick-back action and thus relieves the upper portion of the tower of considerable strain which would otherwise be imposed upon it and particularly when the discharge of the water from the nozzle begins.

After the tower has been retracted as hereinbefore explained, the cable 27 will be used to pull the casing and tower to their normal or horizontal positions, as gravity tends to maintain them in an upright position, because when the tower is retracted, its lower end overbalances the upper end and hence tends to maintain the casing and tower in an upright position. The legs when not in use will be carried upon the truck.

From the above description it will be apparent that I have produced a water tower embodying the features of construction enumerated as desirable and I wish it to be understood that while I have illustrated and scribed the preferred embodiment of the invention, I do not desire to be restricted to the exact details of construction shown and described as obvious modifications will suggest themselves to one skilled in the art.

I claim:

1. The combination of a wheeled truck, a water tower pivoted on said truck, and means supporting said tower in a horizontal position including a support movable out of the path of one of the arms of the tower as the latter swings to vertical position.

2. The combination of a wheeled truck, a water tower pivoted on said truck, and supports carried on the truck for holding the tower in horizontal position, one of said supports being movable into and out of the path of the downward moving arm of the tower as the tower swings into vertical position.

3. The combination with a wheeled truck and a frame carried thereby, of a casing pivotally carried by said frame, a water tower extending through the casing, and supports carried by the truck for holding the casing and tower in a substantially horizontal position; one of said supports being capable of swinging out of the path of pivotal movement of the tower.

4. The combination of a wheeled truck, a water tower pivoted on said truck, an adjustable device for limiting the pivotal movement of the tower in one direction, and means acting automatically to secure the tower at the limit of said pivotal movement.

5. The combination of a wheeled truck, a water tower pivoted on said truck, an adjustable stop for limiting the movement of the tower as it swings into vertical position, and means acting automatically to lock the tower in said position.

6. The combination with a wheeled truck and a frame carried thereby, of a casing pivotally carried by said frame, a water tower extending through the casing, an adjustable device to limit the pivotal movement of the tower in one direction, and automatic means for securing the tower in a substantially upright position.

7. The combination with a wheeled truck and a frame carried thereby, of a casing pivotally carried by said frame, a water tower extending through the casing, lugs projecting from the casing, a longitudinally adjustable yoke supported from the truck and below the pivotal point of the casing, to receive the lower end of the same when swung to a substantially upright position, and catches for interlocking with the lugs of the casing.

8. The combination with a wheeled truck, frames carried by and at opposite sides of the longitudinal center of the truck, a support rigid with and depending from said truck below the plane of said frames, a forwardly extending yoke carried by said support, a casing between and pivoted to said frames and adapted when swung to a substantially upright position to enter said yoke, and means for automatically locking the casing to the yoke.

9. The combination with a wheeled truck, frames mounted thereon at opposite sides of its longitudinal center, bearing boxes vertically adjustable in and bearing a pivotal relation to said frames, a casing arranged between and pivoted to said bearing boxes and adapted to swing from a substantially horizontal to a substantially vertical position, and means for automatically locking the casing in a substantially upright position.

10. The combination with a wheeled truck, frames mounted thereon at opposite sides of its longitudinal center, bearing boxes vertically adjustable in and bearing a pivotal relation to said frames, a casing arranged between and pivoted to said bearing boxes and adapted to swing from a substantially horizontal to a substantially vertical position, means for automatically locking the casing in a substantially upright position, a water tower fitting in and extending beyond the ends of the casing, and means forward of the casing for engagement with the tower to prevent the same and the casing from swinging from a substantially horizontal to a substantially vertical position.

11. The combination with a wheeled truck, frames mounted thereon at opposite sides of its longitudinal center, bearing boxes vertically adjustable in and bearing a pivotal relation to said frames, a casing arranged between and pivoted to said bearing boxes and adapted to swing from a substantially horizontal to a substantially vertical position, means for automatically locking the casing in a substantially upright position, a water tower fitting in and extending beyond the ends of the casing, means forward of the casing for engagement with the tower to prevent the same and the casing from swinging from a substantially horizontal to a substantially vertical position, and means carried by the truck rearward of the casing to engage the tower and coöperate with the said means engaging the tower forward of the casing in holding the latter and the tower in a substantially horizontal position.

12. The combination with a wheeled truck and a frame carried thereby, of a casing pivotally carried by said frame, a water tower extending through the casing, supports carried by the truck for holding the casing and tower in a substantially horizontal position; one of said supports being movable into and out of the path of pivotal movement of said tower to permit the tower to swing to an upright position, and an anchor device carried by and adjustable longitudinally of the tower and adapted for engagement with the ground when the tower and casing occupy a substantially vertical position.

13. The combination with a wheeled truck and a frame carried thereby, of a casing pivotally carried by said frame, a water tower extending through the casing, supports carried by the truck for holding the casing and tower in a substantially horizontal position; one of said supports being movable into and out of the path of pivotal movement of said tower to permit the tower to swing to a horizontal position, and an anchor device carried by and adjustable longitudinally of the tower and adapted for engagement with the ground when the tower and casing occupy a substantially vertical position; said anchor device being also adjustable angularly to squarely engage the ground irrespective of whether the tower is vertical or inclined.

14. The combination with a wheeled truck and a frame carried thereby, of a casing pivotally carried by said frame, a water tower extending through the casing, supports carried by the truck for holding the casing and tower in a substantially horizontal position, one of said supports being movable into and out of the path of pivotal movement of said tower to permit the tower to swing to a horizontal position, an anchor device carried by and adjustable longitudinally of the tower and adapted for engagement with the ground when the tower and casing occupy a substantially vertical position, and a plurality of upwardly converging legs to brace the tower firmly from the ground in an upright position.

In testimony whereof I affix my signature, in the presence of two witnesses.

CLYDE W. FINK.

Witnesses:
HELEN C. RODGERS,
G. Y. THORPE.

---

Copies of this patent may be obtained for five cents each, by addressing the "Commissioner of Patents, Washington, D. C."